United States Patent [19]

van Gerwen et al.

[11] 4,313,203
[45] Jan. 26, 1982

[54] TRANSMISSION SYSTEM FOR THE TRANSMISSION OF BINARY DATA SYMBOLS

[75] Inventors: Petrus J. van Gerwen; Wilfred A. M. Snijders, both of Eindhoven, Netherlands

[73] Assignee: U.S. Philips Corporation, New York, N.Y.

[21] Appl. No.: 134,038

[22] Filed: Mar. 26, 1980

[30] Foreign Application Priority Data

Apr. 20, 1979 [NL] Netherlands .................. 7903103

[51] Int. Cl.³ .................................................. H03K 3/02
[52] U.S. Cl. ........................................ 375/17; 370/18; 375/96; 375/19
[58] Field of Search .................. 375/17–19, 375/20, 25, 53, 84–87; 340/347 DD, 347 SN; 361/245; 307/268; 328/118, 119

[56] References Cited

U.S. PATENT DOCUMENTS

| | | | |
|---|---|---|---|
| 3,387,220 | 6/1968 | Lender | 375/18 |
| 3,508,153 | 4/1970 | Gerrish | 375/18 |
| 3,846,583 | 11/1974 | Boulter | 375/55 |
| 4,053,713 | 10/1977 | Nitadori | 375/18 |
| 4,207,528 | 6/1980 | Sawai | 375/20 |

*Primary Examiner*—Benedict V. Safourek
*Assistant Examiner*—Stephen Chin
*Attorney, Agent, or Firm*—Thomas A. Briody; William J. Streeter; Edward W. Goodman

[57] ABSTRACT

A transmission system for the transmission of binary data symbols is described in which a so-called "crankshaft code," in combination with a receiver having a special filter characteristic, enables a more optimum signal detection, independent of the cable characteristic.

The system is used for digital transmission over cables in the local telephone network.

3 Claims, 32 Drawing Figures

TRANSMISSION SYSTEM FOR THE TRANSMISSION OF BINARY DATA SYMBOLS

BACKGROUND OF THE INVENTION (1) Field of the invention

The invention relates to a transmission system for transmitting binary data symbols in synchronous consecutive symbol time intervals having a duration of T seconds.

The invention is particularly applicable to the field of data transmission using the cables of the public telephone system, between the subscribers and the telephone exchanges, the spectrum of the binary information signal extending from 0 Hz to a certain highest frequency. The component at 0 Hz, the d.c. component, will be absent from the transmitted signal when transformer couplings are present in the cable.

(2) Description of the prior art

Figure 3:
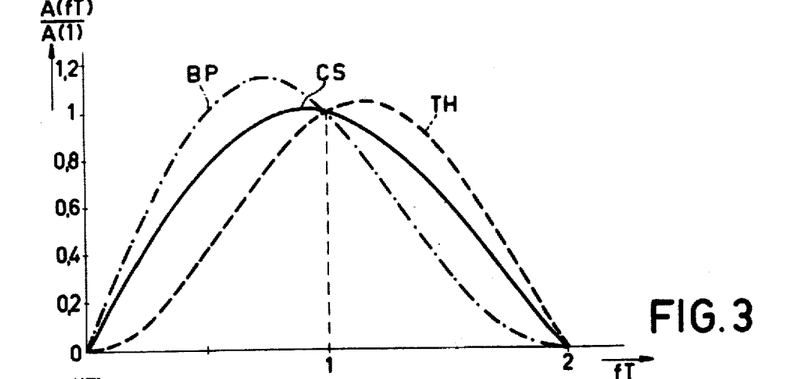
FIG. 3 shows some amplitude spectra resulting from different modulation (coding) methods.

A generally known method of transmitting binary information signals without a d.c. component and with sufficient clock information to enable a clock signal to be easily generated is the bi-phase modulation. In accordance with this method the binary information signal is phase modulated on a carrier at the frequency which equals the bit rate (1/T Hz), which is in-phase with the information signal. U.S. Pat. No. 3,846,583 describes a variant of this method. The phase of the carrier according to this variant is shifted through 90° which respect to the binary information signal. In view of the special pulse shape then occurring the name "top hat" modulation or code was proposed for this variant. The amplitude spectra of the modulated signals in accordance with these modulation methods are shown in FIG. 3 by means of the curve BP for the bi-phase modulation and by means of the curve TH for the "top hat" modulation. These two spectra are asymmetrical with respect to the frequency which equals the bit rate (fT=1).

In the above methods, for an optimum detection of the symbols without intersymbol interference, a receive filter will be required whose filter characteristic has an opposite asymmetry. However, this results in a detection which is not so optimum as regards the signal-to-noise ratio.

SUMMARY OF THE INVENTION

The invention has for its object to provide a transmission system of the type referred to in which an optimum detection of the data symbols is possible at the receiving end both as regards the intersymbol interference and the signal-to-noise ratio, this detection being substantially independent of the cable characteristic, for a large range of cable lengths, for example 0-4 km.

The transmission system according to the invention is characterized in that at the transmitter end each data symbol is converted into two rectangular pulses of opposite polarity, corresponding points of which are separated by a duration of T/2 seconds, each pulse having a duration of T/4 seconds and occurring at, or after, a respective period from the beginning of the symbol time interval, and that, at the receiver end, the received signal comprising the converted data symbols is filtered in accordance with a low-pass filter characteristic having zeros at 0 Hz and 2/T Hz and a sinusoidal variation between these zeros.

SHORT DESCRIPTION OF THE FIGURES

FIG. 6a–6d show the amplitude spectrum, the impulse response and the eye pattern, respectively, of the transmission system according to the invention, with cable attenuation, and a linear cable characteristic;

DESCRIPTION OF THE EMBODIMENTS

Figure 1:
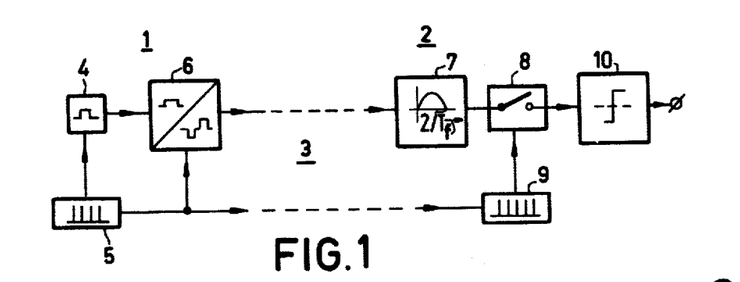
FIG. 1 is a block diagram of a transmission system according to the invention.

A system of the type set forth in FIG. 1 has for its object to transmit binary data symbols, called bits hereinafter, from a transmitter 1 (FIG. 1) to a receiver 2 through a transmission medium 3. This medium 3 may consist of one or more sections of a cable and may comprise transformer couplings. Signals containing a d.c. component cannot then be transmitted over the cable.

The transmitter 1 comprises a data source 4 supplying a bit stream with bit intervals of T seconds which are synchronized by clock signal device 5. The bits are applied to a code generator 6 which generates for each bit a predetermined time function or waveform having a duration of T seconds.

The receiver 2 comprises a receive filter 7 having connected thereto a sampling switch 8, which is controlled synchronously with the received data signals by a clock signal device 9. A polarity detector 10, for determining the value of each received bit, is connected to sampling switch 8.

The clock signal device 9 can be synchronized by clock signal device 5, by means of a separate synchronizing signal which is transmitted from clock signal device 5 to clock signal device 9 through the transmission medium 3. This is symbolically shown by the dotted connection between these devices. In practice it is often desired, for clock signal device 9, that it can obtain the synchronizing information from the transmitted data signal itself. The transmitted data signal contains signal transitions at distances of T/2 sec., which furnish information about the clock of the transmitter. Deriving the clock signal from the data signal does not form the subject of the present invention.

Figure 2:
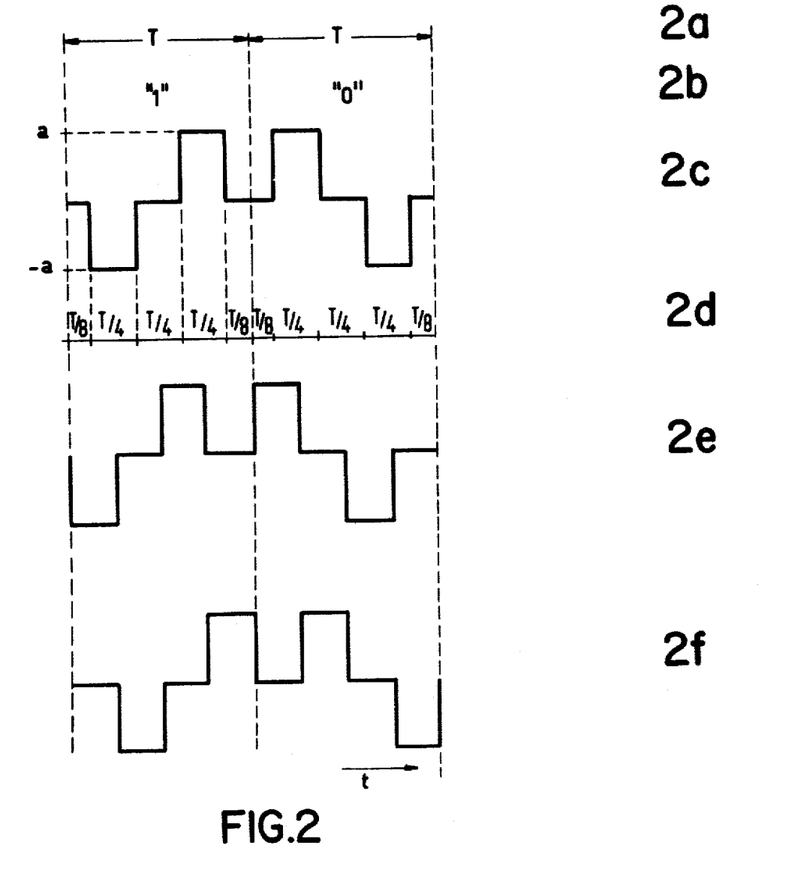
FIGS. 2a–2f show time diagrams.

The code generator 6 generates the waveforms which are shown in FIG. 2. FIG. 2a shows the subdivision of the time axis in symbol intervals of T seconds. FIG. 2b shows a bit having the value "1" in a first symbol interval and a bit having the value "0" in a second symbol interval. FIG. 2c shows the associated waveforms, the duration of the different portions of the waveforms being shown in FIG. 2d.

The waveform for the bit value "1" consists of a negative pulse, which is followed by a positive pulse, these pulses having a duration of T/4 seconds. The spacing between corresponding points of the pulses is T/2 seconds. The waveform for the bit value "0" is identical to the waveform for the bit value "1" but is of the opposite polarity. The distance of the pulses from the beginning of the symbol interval is of no importance. The waveforms shown in FIGS. 2e and 2f may consequently also be used. Hereinafter it will be assumed that the transmitter 1 generates the waveforms shown in FIG. 2c. A shift of the waveforms to the waveforms of FIGS. 2e or 2f will affect the delay characteristic of the transmitter 1 but will not affect the amplitude spectrum of the transmitted signal.

As a result of the code chosen, which can be termed a "crankshaft"-code because of the waveform shape which it results in, the send signal obtains an amplitude spectrum as illustrated in FIG. 3 by the curve CS (crankshaft). For comparison, the amplitude spectra for a biphase modulation, curve BP, and for a "top hat" code, curve TH, are shown in the same Figure. The portion of the amplitude spectrum which is above twice the bit rate, the point fT=2, will not be considered because it is cutoff in the receiver 2. If so desired, this portion of the spectrum can be eliminated in the transmitter 1 by means of a simple filter. As will be apparent from FIG. 3, the amplitude spectrum in accordance with the crankshaft code is highly asymmetrical around an axis passing through the point fT=1. This symmetry is advantageous when a cable, whose amplitude versus frequency characteristic has a substantially linear variation, is included between transmitter and receiver. Signal components having frequencies which are symmetrical with respect to the bit rate transmit the same information, in the manner of a double-sideband modulated signal. These signal components are attenuated by a linear cable characteristic in a complementary manner, such that the sum of these signal components is attenuated in a uniform manner. For the transmission of information, this corresponds to attenuation by means of a cable having a uniform characteristic.

Neglecting a real constant factor, the Fourier transform of the time function shown in FIG. 2c, which is denoted the spectrum function of the crankshaft code hereinafter, its defined by:

$$\frac{1}{j} \sin\left(\frac{\omega T}{4}\right) \times \frac{\sin\left(\frac{\omega T}{8}\right)}{\frac{\omega T}{8}} \quad (1)$$

The last term in expression (1) is the form factor resulting from the pulse width of T/4 second. For Dirac impulses the form factor is 1. The last term in expression (1) is of only little influence in the interval from 0 Hz to twice the bit rate (fT=2). Thus the amplitude spectrum of the crankshaft code has an approximately sinusoidal variation.

Starting from a spectrum function for the transmitter as defined by the first part of the expression (1), the receiver has an optimum signal-to-noise ratio for white noise, when the transfer function of the receive filter is defined by:

$$j \sin(\omega T/4) \quad (2)$$

In principle, the receive filter 7 is a low-pass filter having a cut-off frequency of twice the bit rate. The optimum receive filter has a transfer function which, below the cut-off frequency, satisfies expression (2). In the optimum case, the spectrum function of the transmitter is fully represented by the first part of expression (1). Owing to the presence of the last term in expression (1), however, the optimum is never fully attained. However, it appears that with the use of the crankshaft code a signal-to-noise ratio penalty of only 1 dB is incurred.

For proper signal detection, it is desirable for the intersymbol interference to be as small as possible at the output of receiver filter 7. This is the case when the system, formed by the combination of transmitter and receiver, has a transfer function which satisfies the expression $$(\sin(\omega T/4))^2 \quad (3)$$

Figure 4A:
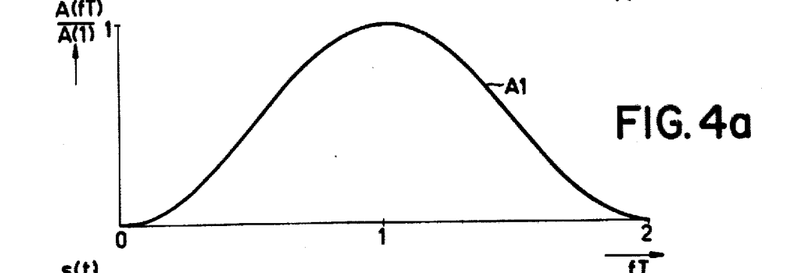
FIGS. 4a–4c show the amplitude spectrum, the impulse response and the eye pattern, respectively, of the transmission system according to the invention, without cable attenuation.
Figure 4B:
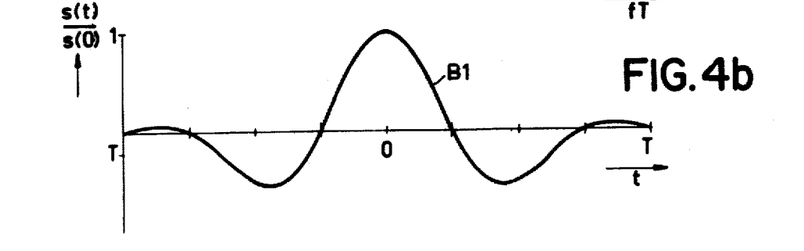
Figure 4C:
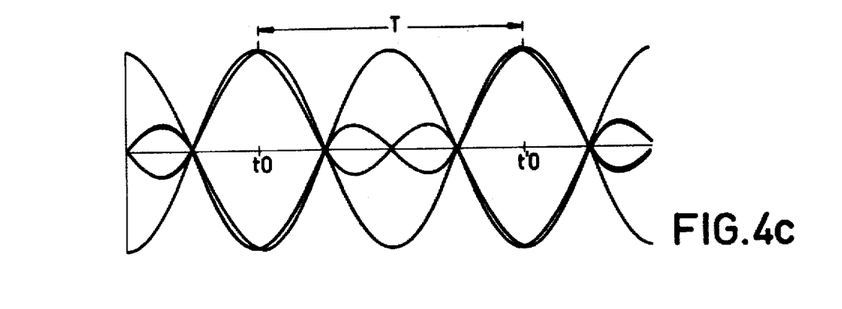

In FIG. 4a this characteristic is illustrated by curve A1. The associated impulse response is shown in FIG. 4b by curve B1. The eye pattern occurring at the output of the receive filter 7 is shown in FIG. 4c, wherein the symbol period T is indicated. It will be apparent that no intersymbol interference is produced at the sampling instants t0, t'0.

For the realization of a system having a transfer function satisfying expression (3) in the case of the crankshaft code, the receive filter 7 is chosen so that the transfer function between 0 Hz and the cut-off frequency satisfies the expression:

$$j \omega T^* \cos((\omega T/8)) \quad (4)$$

It can be easily seen that multiplication of the expressions (1) and (4) will result in expression (3), neglecting a non-relevant constant real factor.

Figure 12:
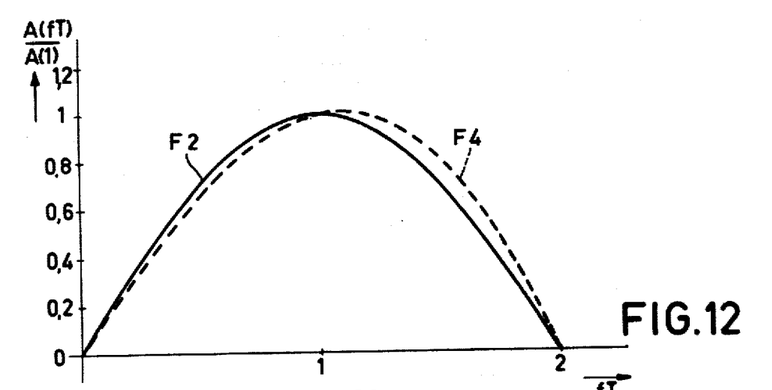
FIG. 12 shows some filter characteristics of the receive filter.

Compared with a receive filter in accordance with expression (2), a small signal-to-noise ratio penalty of only 0.1 dB is incurred when a receive filter in accordance with expression (4) is used. The filter characteristics in accordance with the expressions (2) and (4) are shown in FIG. 12 by the curves F2 and F4.

Hereinafter it will be assumed that the receive filter 7 satisfies expression (4), which implies that no intersymbol interference occurs at the sampling instants t0, t'0. The system then satisfies the first Nyquist criterion.

Figure 5:
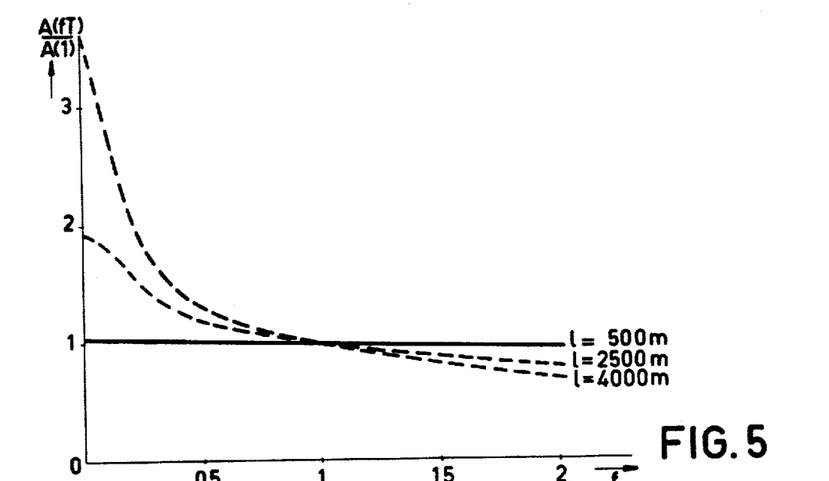
FIG. 5 shows some cable characteristics.

FIG. 5 shows some amplitude-versus-frequency characteristics for different cable lengths. Here and hereinafter a bit rate of 64 kHz will be assumed.

Figure 6A:
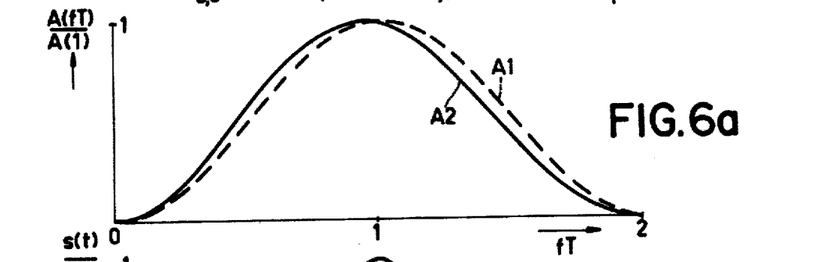
Figure 6B:
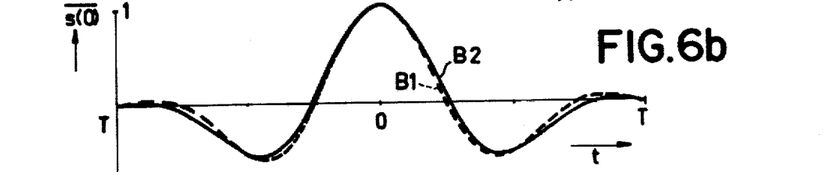
Figure 6C:
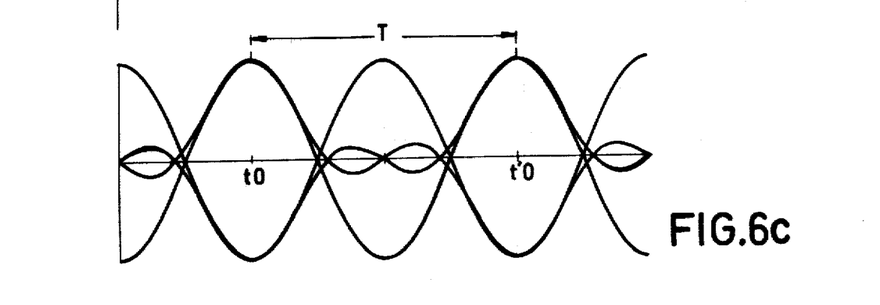
Figure 7:
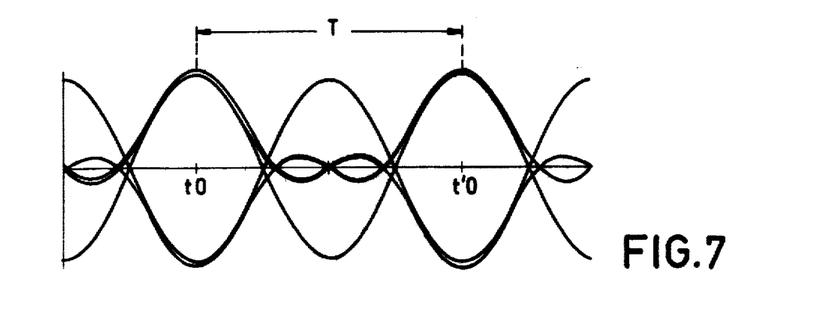
FIGS. 7a–7c show the amplitude spectrum, the impulse response and the eye pattern, respectively, of the transmission system according to the invention with a cable which is 4 km long.
Figure 8:
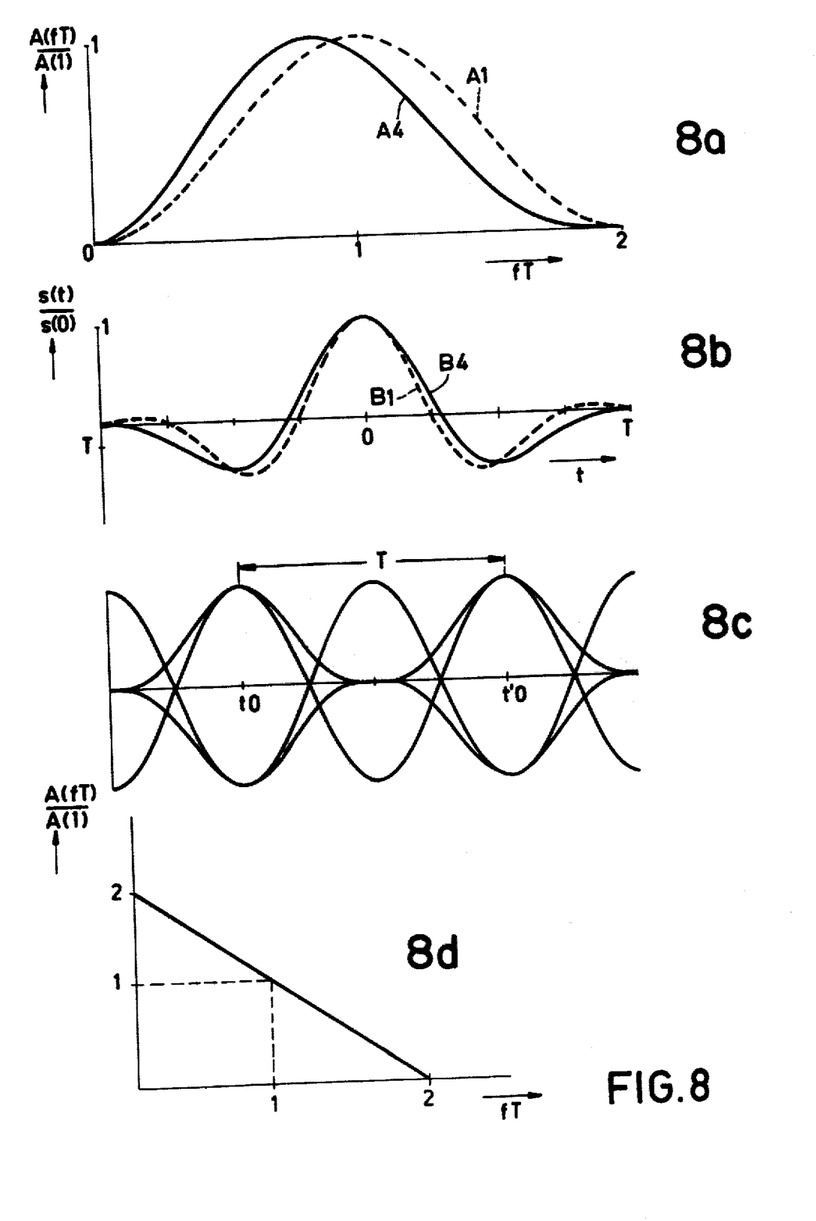
FIGS. 8a–8d show the amplitude spectrum, the impulse response and the eye pattern, respectively, of the transmission system according to the invention, with cable attenuation, and a linear cable characteristic.

To illustrate the operation of the system when a cable is present between the transmitter and the receiver, FIGS. 6, 7 and 8 show the amplitude spectrum, the impulse response and the eye pattern at the output of the receive filter, for different cable characteristics.

The amplitude spectrum is represented by the curves A2, A3 and A4, in the FIGS. 6a, 7a and 8a, curve A1 of FIG. 4a serving as reference. The impulse response is represented by the curves B2, B3 and B4 in the FIGS. 6b, 7b and 8b, the curve B1 of FIG. 4b serving as reference. The eye pattern is shown in the FIGS. 6c, 7c and 8c.

FIG. 6 relates to a cable having a linear amplitude-versus-frequency characteristic, as illustrated in FIG. 6d. FIG. 7 relates to a cable having a length of 4 km, whose amplitude-versus-frequency characteristic is shown in FIG. 5. FIG. 8 relates to a linear amplitude-versus-frequency characteristic as shown in FIG. 8d, having a cut-off frequency equal to twice the bit rate. It will be apparent that in all these cases the eye pattern has substantially its maximum height at the sampling instants t0, t'0 and that also the width of the eye on either side of the sampling instants t0, t'0 has substantially the maximum value. Consequently, the cable characteristic does substantially not affect the signal detection. The only influence of the cable consists in an attenuation of the peak value of the received signal at the sampling instants.

Figure 9:
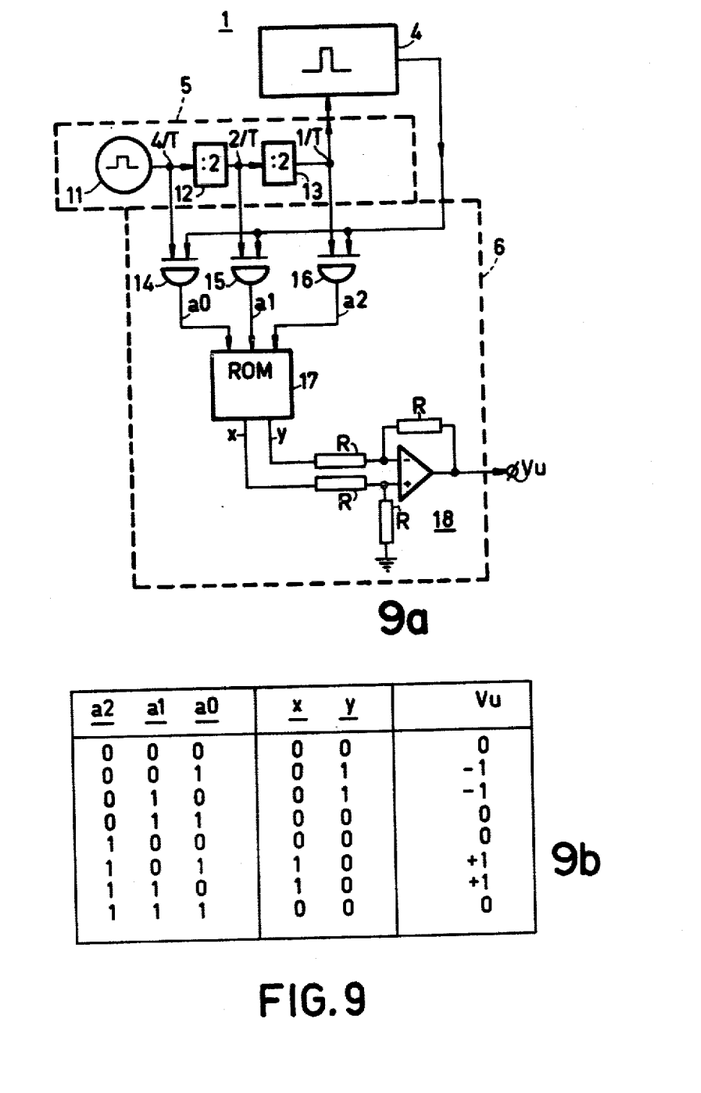
FIG. 9a is the block diagram of an embodiment of the code generator for use in the transmission system shown in FIG. 1
FIG. 9b shows an associated storage table.

FIG. 9a shows an embodiment of transmitter 1. The clock signal device 5 comprises a pulse source 11 having a rate 4/T Hz, which is four times the bit rate. This rate is divided in two divider stages 12 and 13 into twice the bit rate 2/T Hz and once the bit rate 1/T Hz. The signals having the rate 4/T, 2/T and 1/T Hz are applied to the exclusive-OR gates 14, 15 and 16 in code generator 6. The output signal of the data source 4 is applied to a second input of these gates. In this manner binary signals $a_0$, $a_1$ and $a_2$ are produced at the outputs of these gates, these bits together forming three-bit addresses for a ROM memory 17. The memory 17 comprises eight memory locations, corresponding with these addresses, an X-bit and a Y-bit having been stored in each location, in accordance with the Table shown in FIG. 9b.

Signals corresponding to an X-bit and a Y-bit read from the memory are applied to the input of a differential amplifier 18 via identical resistors R. This differential amplifier supplies the output signal Vu in accordance with the last column of the Table of FIG. 9b. It can be easily verified that in the symbol intervals of T seconds, the waveforms shown in FIG. 2c are generated at the output of the differential amplifier 18.

Figure 10:
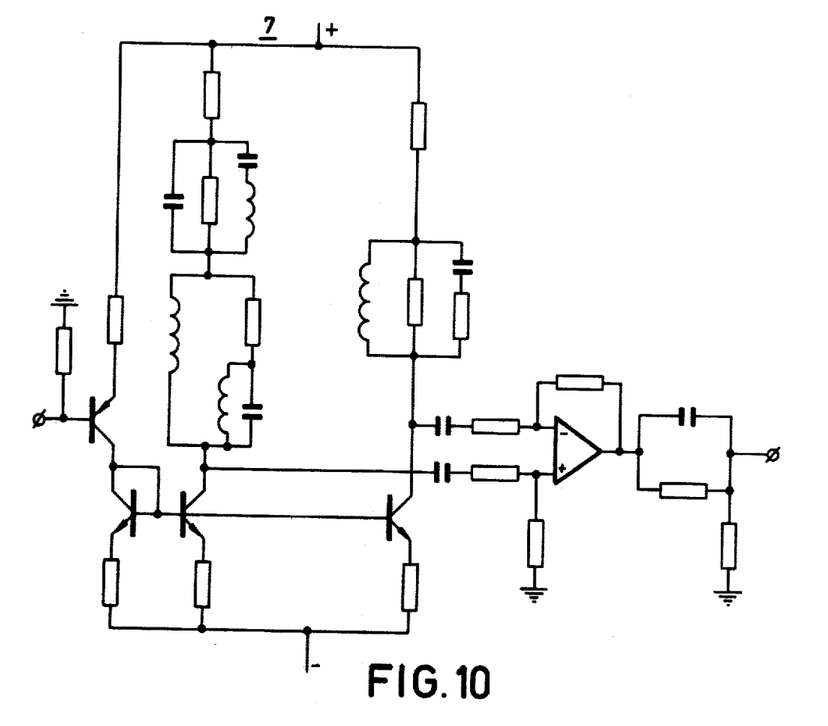
FIG. 10 is the circuit diagram of an embodiment of the receive filter for use in the transmission system shown in FIG. 1.
Figure 11:
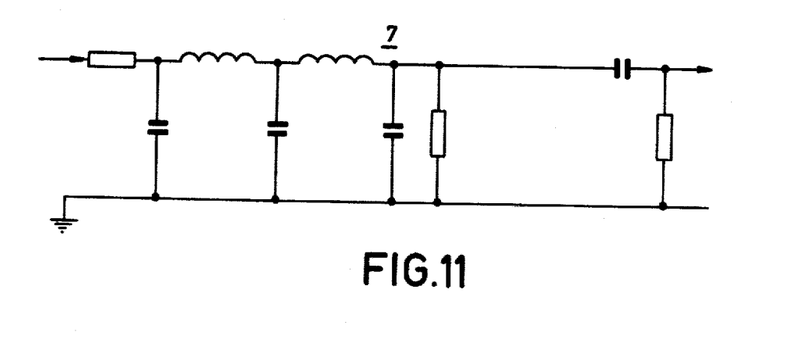
FIG. 11 is the circuit diagram of an alternative embodiment of the receive filter for use in the transmission system shown in FIG. 1.

An embodiment of a receive filter 7 having a transfer function defined by expression (2), curve F2 in FIG. 12, is shown in FIG. 10. An embodiment of receive filter 7 having a transfer function defined by expression (4), curve F (4) in FIG. 12, is shown in FIG. 11. This filter consists of the cascade arrangement of a differentiator having the transfer function $j\omega$ (on the right-hand side in the Figure) and a low-pass filter having the transfer function $\cos(\omega T/8)$ (on the left-hand side of the Figure). A value used in practice for the cut-off frequency was 128 kHz. Determining the component values of the filters for a given cut-off frequency is within the knowledge of one skilled in the art.

Figure 13:
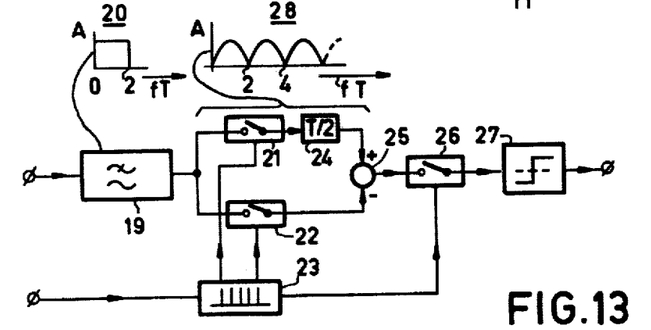
FIG. 13 is the block diagram of an alternative receiver.
Figure 14:
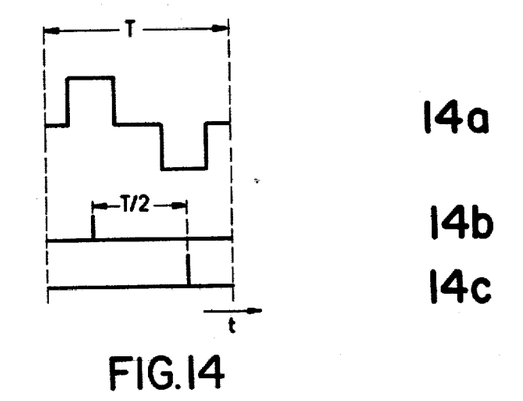
FIGS. 14a–14c show time diagrams.

FIG. 13 shows the block diagram of an alternative receiver for the crankshaft code. This receiver comprises a receive filter 19 having a uniform low-pass characteristic, as shown at 20. Two sampling switches 21 and 22 are connected to the output of the filter 19. These switches are controlled by clock signal device 23 with the bit rate 1/T Hz and a phase difference of 180°. The sampling instants of the switches 21 and 22 are illustrated in FIG. 14b and 14c relative to the waveform of the crankshaft code, shown in FIG. 14a. The signal sample of sampling switch 21 is delayed for half the sampling period by a delay section 24. A difference producer 25 produces the difference between the delayed signal sample and the signal sample of sampling switch 22.

A sampling switch 26 is connected to the output of difference producer 25, a polarity detector 27 being connected to this sampling switch. These two devices correspond to the sampling switch 8 and the polarity detector 10 in FIG. 1. The regenerated binary data symbols appear at the output of polarity detector 27.

The arrangement provided between the output of filter 19 and the input of sampling switch 26 functions as a network having a transfer characteristic as illustrated at 28. This is a periodic characteristic having a sinusoidal variation between 0 Hz and twice the bit rate, in accordance with expression (2). In this receiver the combination of the characteristics 20 and 28 performs the same function as the characteristic of receive filter 7 in the receiver shown in FIG. 1.

What is claimed is:

1. A transmission system comprising a transmitter and a receiver for the transmitter of binary data symbols in synchronous consecutive symbol time intervals having a duration of T seconds, characterized in that the transmitter comprises means for converting each data symbol into two rectangular pulses of opposite polarity, corresponding points of which are separated by a duration of T/2 seconds, each pulse having a duration of T/4 seconds, and occurring at, or after, a respective period from the beginning of the symbol time interval, and, that the receiver comprises means for filtering the received signal, comprising the converted data symbols, in accordance with a low-pass filter characteristic having zeros at 0 Hz and 2/T Hz and a sinusoidal response curve between said zero frequencies.

2. A receiver for use in the transmission system as claimed in claim 1, characterized in that the receiver comprises, in combination with a signal regeneration device, a low-pass filter coupled to the input of said receiver having a filter characteristic with a maximum at 0 Hz and a zero at 2/T Hz and a cosinusoidal response between said maximum and the zero, and a differentiating network arranged in cascade therewith.

3. A receiver for use in the transmission system as claimed in claim 1, characterized in that the receiver comprises, in combination with a signal regeneration device, a low-pass filter having a uniform filter characteristic between 0 Hz and 2/T Hz, two sampling circuits, having a sampling rate of 1/T Hz and operating with a mutual time difference of T/2 seconds, connected to the output of the low-pass filter, and means for applying the difference between the signal samples produced by the sampling circuits to the signal regeneration device in each symbol interval.

* * * * *